US008625882B2

(12) United States Patent
Backlund et al.

(10) Patent No.: US 8,625,882 B2
(45) Date of Patent: Jan. 7, 2014

(54) USER INTERFACE WITH THREE DIMENSIONAL USER INPUT

(75) Inventors: Erik Johan Vendel Backlund, Gantofta (SE); Henrik Bengtsson, Lund (SE); Henrik Heringslack, Malmö (SE); Jari Sassi, Lund (SE); Ola Karl Thörn, Malmö (SE); Peter Åberg, Vinslöv (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 266 days.

(21) Appl. No.: 13/116,583

(22) Filed: May 26, 2011

(65) Prior Publication Data

US 2012/0057806 A1   Mar. 8, 2012

Related U.S. Application Data

(60) Provisional application No. 61/349,917, filed on May 31, 2010.

(30) Foreign Application Priority Data

May 31, 2010   (EP) ..................................... 10164471

(51) Int. Cl.
*G06K 9/00*   (2006.01)
(52) U.S. Cl.
USPC ............................ 382/154; 345/419; 345/422
(58) Field of Classification Search
USPC ................... 382/154; 345/419, 422
See application file for complete search history.

(56) References Cited

U.S. PATENT DOCUMENTS

| 5,844,574 | A  | * | 12/1998 | Yang .............................. 345/534 |
| 6,073,036 | A  | * | 6/2000  | Heikkinen et al. ......... 455/550.1 |
| 7,331,245 | B2 | * | 2/2008  | Nishimura et al. ...... 73/862.046 |
| 7,499,040 | B2 | * | 3/2009  | Zadesky et al. ............... 345/204 |
| 7,519,223 | B2 | * | 4/2009  | Dehlin et al. ................. 382/203 |
| 8,209,628 | B1 | * | 6/2012  | Davidson ...................... 715/790 |
| 8,363,020 | B2 | * | 1/2013  | Li et al. ......................... 345/173 |

(Continued)

FOREIGN PATENT DOCUMENTS

WO   WO 02069124 A1 * 9/2002 ................ G06F 3/03

OTHER PUBLICATIONS

European Search Report and Written Opinion dated Oct. 14, 2010 issued in corresponding EP application No. 10164471.4-1245, 9 pages.

*Primary Examiner* — Jayesh A Patel
(74) *Attorney, Agent, or Firm* — Snyder, Clark, Lesch & Chung, LLP

(57) ABSTRACT

A device and method for image manipulation is provided. The image manipulation may be performed as a function of a three dimensional user input and image or application specific data regarding the displayed image to be manipulated. The three dimensional input may be in the form of a two dimensional position on a touch screen and a measured force in the third dimension. The image or application specific data may be in the form of a maximum depth value indicating the maximum depth of the displayed image. The system may be configured to adjust the image based on a percentage of the measured user input force and a threshold force. The image may be adjusted based on the percentage and the maximum depth.

10 Claims, 4 Drawing Sheets

(56) References Cited

U.S. PATENT DOCUMENTS

| | | | |
|---|---|---|---|
| 2002/0180763 A1* | 12/2002 | Kung | 345/660 |
| 2004/0021663 A1* | 2/2004 | Suzuki et al. | 345/419 |
| 2006/0001650 A1* | 1/2006 | Robbins et al. | 345/173 |
| 2006/0082573 A1* | 4/2006 | Konno et al. | 345/419 |
| 2008/0024454 A1* | 1/2008 | Everest | 345/173 |
| 2008/0131019 A1* | 6/2008 | Ng | 382/255 |
| 2008/0165141 A1* | 7/2008 | Christie | 345/173 |
| 2009/0022396 A1 | 1/2009 | Watanabe et al. | |
| 2009/0160793 A1* | 6/2009 | Rekimoto | 345/173 |
| 2009/0251432 A1* | 10/2009 | Wang et al. | 345/173 |
| 2011/0050588 A1* | 3/2011 | Li et al. | 345/173 |
| 2011/0291943 A1* | 12/2011 | Thórn et al. | 345/173 |
| 2012/0105358 A1* | 5/2012 | Momeyer et al. | 345/174 |

\* cited by examiner

USER INTERFACE WITH THREE DIMENSIONAL USER INPUT

RELATED APPLICATION

This application claims priority under 35 U.S.C. §119, based on U.S. Provisional Patent Application No. 61/349,917, filed May 31, 2010, the disclosure of which is hereby incorporated by reference herein.

TECHNICAL FIELD

Example embodiments presented herein are directed towards a multimedia device, and methods for using the same, comprising a user interface configured to receive a three dimensional input/output and/or alter a displayed image based on the input.

BACKGROUND

Many multimedia devices employ touch screen technology. For example, a user may be able to enlarge or shrink an image on a display screen by placing two fingers on a screen and moving the two fingers away from each other, or closer to each other, respectively, to achieve the desired effect. The use of touch screen technology allows a user to easily navigate through menus and manipulate displayed data. Touch screen technology is also employed in various gaming applications.

While current systems do exist for manipulating an image via input received from a touch screen, none of these systems utilize a measured force with respect to image and/or application specific data. Often user navigation through menus or gaming systems involves predefined steps or movements. Image manipulation or user navigation may be greatly improved with the use of measured force data and image or application specific data as it provides greater accuracy.

SUMMARY

Thus, an objective of the present invention remedies the above mentioned problems with respect to current systems. According to example embodiments, an image adjusting system is provided. The image adjusting system may include a receiving port that may be configured to receive a user input through a touch screen interface. The image adjusting system may also include an analyzer that may be configured to provide a depth configuration value based on the user input and image depth information of a displayed image. The image adjusting system may further include a processor that may be configured to alter the displayed image based on the depth reconfiguration value.

The image depth information may define a maximum depth of the image. The image depth information may be embedded in metadata or may be determined through image analysis. The user input may be in the form of a three dimensional input. The user input may be further defined as a location in a two dimensional location and an applied force measured in a third dimension.

In example embodiments, the analyzer may further include a comparator that may be configured to compare the applied force to a threshold force value. The comparator may further be configured to determine a difference percentage of the applied force and the threshold value. The analyzer may be further configured to provide the depth reconfiguration value based on the difference percentage. The threshold value may be programmably adjustable.

Example embodiments further include a multimedia device for displaying images, characterized that the multimedia device may comprise a touch screen configured to receive a three dimensional user input. At least one dimension of the user input may be a measure of force. The device may further include a processor that may be configured to alter a displayed image as a function of a percentage of the applied force.

Example embodiments also include a method for providing a user interface. The method may include receiving a user input through a touch screen interface, evaluating a depth reconfiguration value based on the user input and image depth information of a displayed image, and altering the displayed image based on the depth reconfiguration value. The evaluating may further include comparing the applied force to a threshold force value, determining a difference percentage of the applied force and threshold force value, and providing the depth reconfiguration value based on the difference percentage.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

In the following description, for purposes of explanation and not limitation, specific details are set forth, such as particular components, elements, techniques, etc. in order to provide a thorough understanding of the example embodiments presented herein. However, it will be apparent to one skilled in the art that the example embodiments may be practiced in other manners that depart from these specific details. In other instances, detailed descriptions of well-known methods and elements are omitted so as not to obscure the description of the example embodiments.

Example embodiments presented herein are directed towards image manipulation or navigation through an interface utilizing a three dimensional user input and image or application specific data. For example, embodiments presented herein may be utilized in gaming applications where a user may walk through a virtual world. Based on a measurement of a force component of the user input, a determination may be made as to how far (with respect to depth perception) a user may navigate through the virtual world.

Similarly, a user may zoom in or enlarge a displayed image, where the amount of enlargement is determined in part by the measured force component of the user input. In contrast to current systems which require the use of two fingers to perform such tasks, example embodiments are presented herein which require the use of only one finger and provide great accuracy through the use of image or application specific data.

Embodiments may also be employed for user navigation through a menu. For example, a user may cycle through a number of cascaded menus and a determination as to how for within the menu selection a user may go may be based on a force measurement of the user input.

It should be appreciated that example embodiments presented herein may be employed in a variety of applications, for example, applications involving image, movie, gaming, menu systems, or any other type of applications known in the art which involve a form of display.

Figure 1:
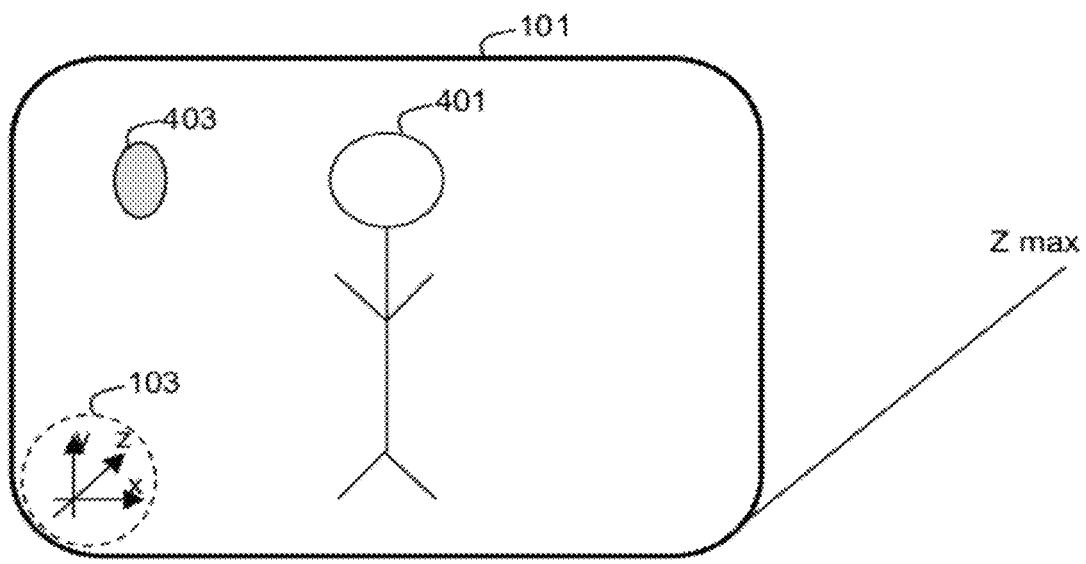
FIG. 1 is an illustrative example employing example embodiments.

FIG. 1 provides an illustrative example use of the embodiments presented. In FIG. 1, a user is navigating through a virtual world in a gaming application. The virtual user is represented as the stick FIG. 401. A user may navigate through the virtual world by pressing the touch screen, for example, in location 403. An imaging system, according to example embodiments, may recognize the X and Y coordinates, as shown in axis 103, as the location which the user desires to navigate to. The imaging system may further measure a force exerted by the user interacting the touch screen 101 in the Z direction, as shown in axis 103.

In the current example, the measured force exerted by the user is 2N. A threshold force (or maximum force) associated with the gaming application is 5N. The imaging system may compare the two force values and the system may determine a difference percentage of 40% (e.g., 2N is 40% of 5N).

The imaging system may further provide a depth reconfiguration value based on image depth information associated with the gaming application. In FIG. 1 the image depth information is the maximum depth, which is shown as Z max. In the current example Z max is set as 20 km. Given that the difference percentage has been calculated as 40%, the system may calculate the depth configuration value as 8 km (40% of the Z max value 20 km). This information may then be utilized to alter the displayed image in a manner that the user will navigate through the virtual world a total distance of 8 km in the direction of user defined location 403.

Figure 2:
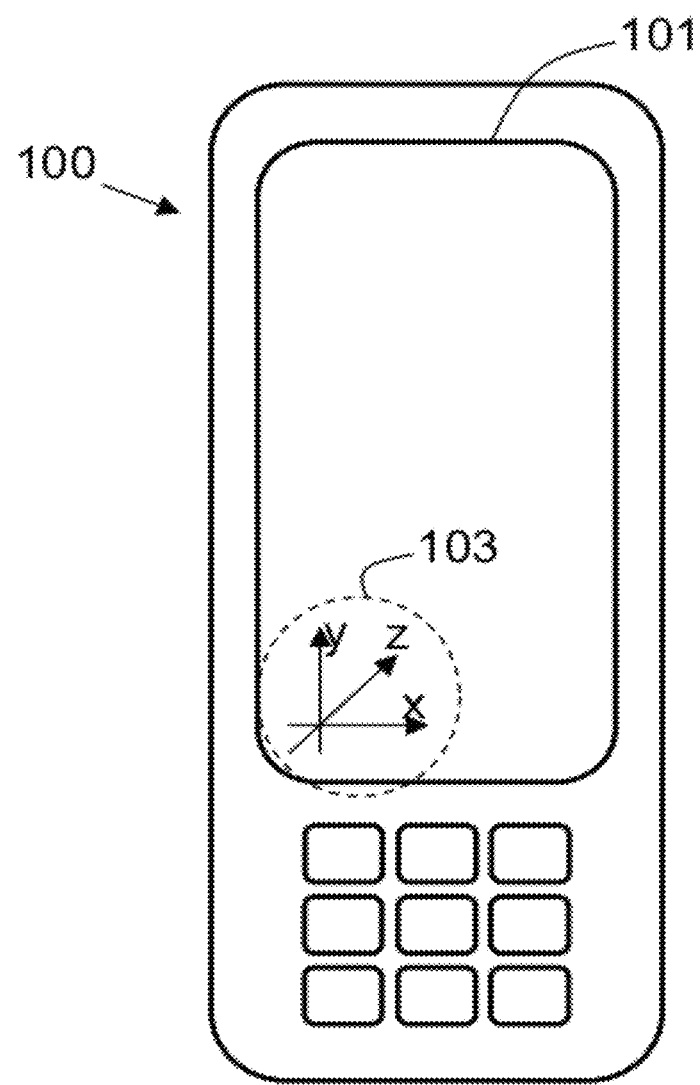
FIG. 2 is an illustration of a multimedia device according to an example embodiment.

FIG. 2 illustrates an example of a multimedia device in the form of a mobile phone 100 that may employ the example embodiments presented herein. Example embodiments presented herein will be explained with a mobile phone being the multimedia device. It should be appreciated that example embodiments may be applied to other multimedia devices having an electronic visual display known in the art, for example, PDAs or video game devices.

The multimedia device 100 may include a touch screen 101. The multimedia touch screen 101 may employ, for example, capacitive sensing technology to detect when a user is providing input via the screen 101. It should be appreciated that any other sensing means known in the art may be employed, for example, resistive technology, surface acoustic wave technology, surface capacitance technology, projected capacitance technology, mutual capacitive sensors, self capacitance sensors, strain gauge or force panel technology, optical imaging, dispersive signal technology, acoustic pulse recognition, and coded LCD technology.

Figure 3:
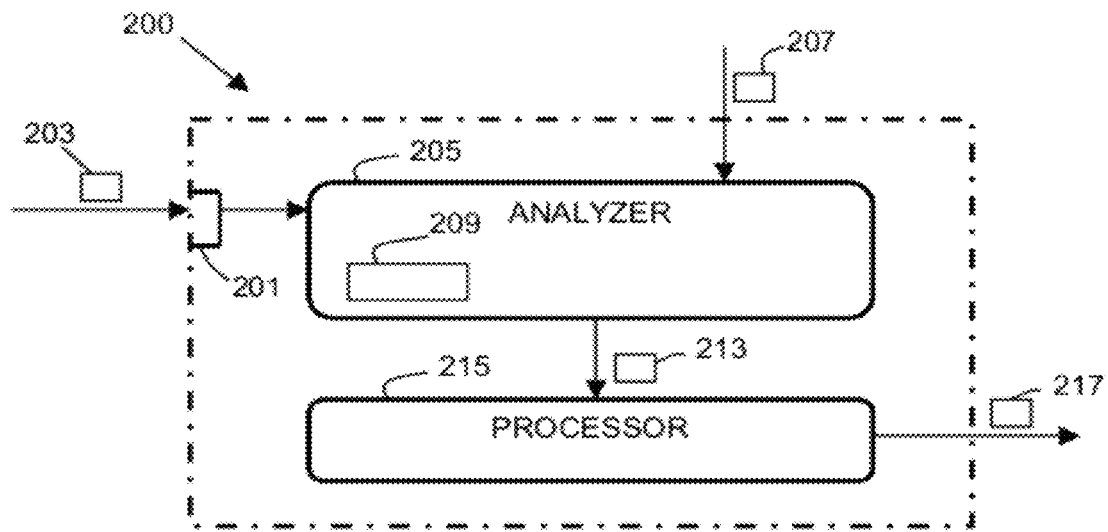
FIG. 3 is a block schematic of an image adjust system according to example embodiments.
Figure 4:
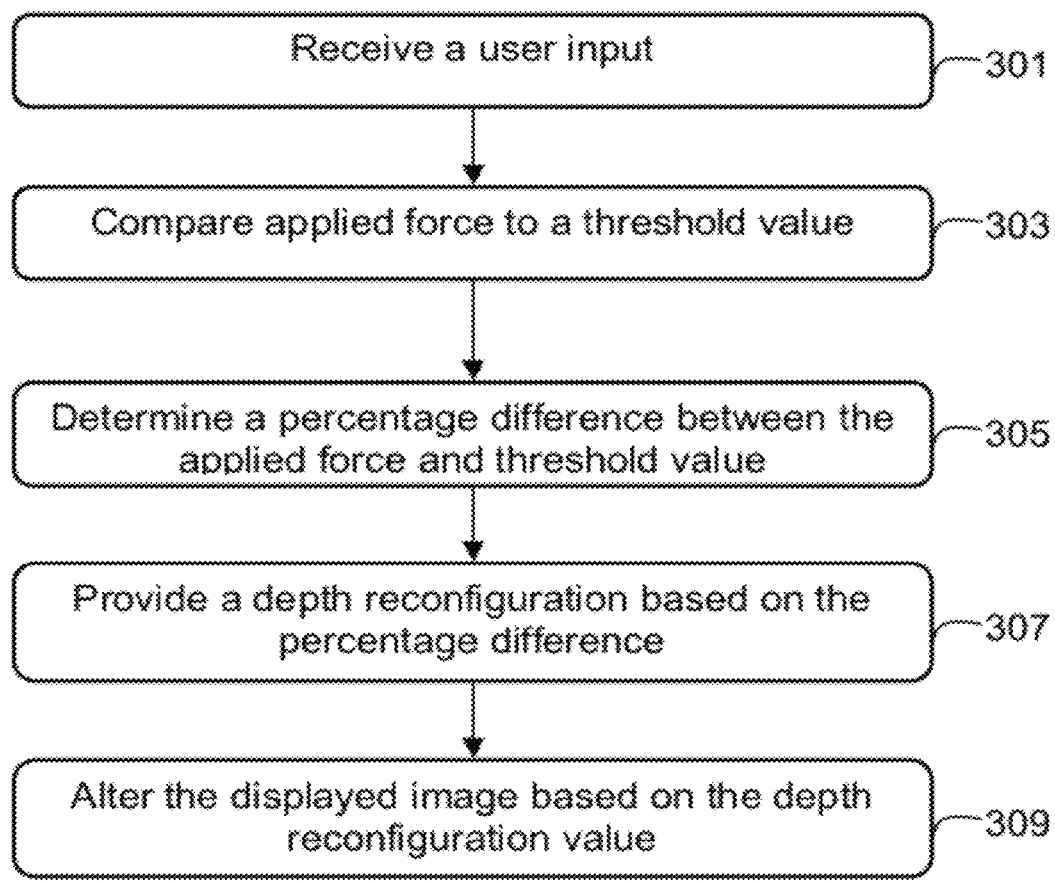
FIG. 4 is a flow diagram depicting operational steps which may be taken by the system of FIG. 3 according to example embodiments.

The multimedia device 100 may further include an image adjusting system 200 that may be configured to adjust an image displayed on the screen 101 of the multimedia device 100, as shown in FIG. 3. FIG. 4 is a flow chart illustrating example operational steps that may be taken by the image adjusting system 200 of FIG. 3. The image adjusting system 200 may include an input port 201 that may be configured to receive user data 203 (301). The user data may be three dimensional data providing position data and force data. The position data may include an X and Y coordinate providing information as to where a user touched the screen 101, as shown by coordinate axis 103. The force data may be a pressure reading as to how much force a user touched the screen 101 within a Z direction, as indicated by the coordinate axis 103.

Once received by the input port 201, the user data 203 may then be transferred to an analyzer 205. The analyzer may also be configured to receive image depth information regarding an image currently being displayed on screen 101. The image depth information may be included within the image itself as embedded metadata. Alternatively, the image depth information may be obtained through image analysis. It should be appreciated that image depth information may also be obtained through any other means known in the art.

Upon receiving the image depth information 207, the analyzer 205 may utilize a comparator 209 to compare the applied force in the Z coordinate and a threshold force value (302). The threshold force value may define a maximum force to be applied on the multimedia device 100 or a maximum force to be applied to a specific image. The threshold force may be programmably adjusted by a user. The adjustment to the threshold force may be with respect to the maximum force numerical value as well as to what the threshold force will be associated with (e.g., the multimedia device, a specific image, or a specific application). It should be appreciated that the threshold force value may be included in the image depth information 207 or may be registered within the analyzer 205, or within else where in the image adjusting system 200.

Once the analyzer 205 has received the threshold force value and the user applied force value, the comparator 209 may compare the two force values and provide a percentage difference of the two values (303, 305). Upon computation of the percentage difference, the analyzer 205 may be configured to determine a depth reconfiguration value based on the determined percentage difference (307). For example, if the determined percentage difference is 50%, the analyzer may calculate the depth reconfiguration to be 50% of a Z coordinate maximum. The Z coordinate maximum may be defined as the maximum depth associated with a particular image or application. For example, if a user is utilizing an application in which an associated Z coordinate maximum is 10 km, a percentage difference of 50% would result in a depth reconfiguration value of 5 km (50% of the Z coordinate maximum). It should also be appreciated that the Z coordinate maximum depth may also be associated with the multimedia device. It should further be appreciated that the Z coordinate maximum depth value may also be programmably adjustable.

Once the depth reconfiguration has been calculated, the analyzer 205 may be configured to send the depth reconfiguration 213 to a processor 215. The processor 215 may be configured to provide alteration instructions 217 to adjust the image displayed on the screen 101 (309).

It should be appreciated that, using example embodiments, a user may be able to steer a screen pointer directly to a three dimensional point by, for example, enabling 100% of the total depth.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The above mentioned and described embodiments are only given as examples and should not be limiting to the example embodiments. Other solutions, uses, objectives, and functions within the scope of the invention as claimed in the below described patent claims should be apparent for the person skilled in the art.

The invention claimed is:

1. A method of providing a user interface comprising:
  receiving a three dimensional user input through a touch screen interface, wherein the three dimensional user input defines a two dimensional location and an applied force in a third dimension;
  evaluating a depth reconfiguration value based on a difference percentage of the user input and image depth information of a displayed image, wherein evaluating the depth reconfiguration value further comprises:
  comparing the applied force to a threshold force value;
  determining the difference percentage of the user input based on the applied force and the threshold force value; and
  providing the depth reconfiguration value based on the difference percentage;
  wherein the depth reconfiguration value is a distance value in a z-axis; and altering the displayed image based on the depth reconfiguration value.

2. The method of claim 1 wherein the image depth information defines a maximum depth of the image.

3. The method of claim 1 wherein the image depth information is embedded in metadata.

4. The method of claim 1 further comprising determining the image depth information through image analysis.

5. The method of claim 1, wherein the threshold force value is programmably adjustable.

6. An image adjusting system comprising a receiving port configured to receive a three dimensional user input through a touch screen interface, comprising:
  an analyzer configured to provide a depth reconfiguration value based on a difference percentage of the user input and image depth information of a displayed image, wherein the user input defines a two-dimensional location and an applied force in a third dimension and wherein the depth reconfiguration value comprises a distance value in a z-axis; wherein the analyzer further comprises a comparator configured to compare the applied force to a threshold force value, wherein the analyzer is further configured to determine the difference percentage of the user input based on the applied force and the threshold force value, and provide the depth reconfiguration value based on the difference percentage; and
  a processor configured to alter the displayed image based on the depth reconfiguration value.

7. The system of claim 6, wherein the image depth information defines a maximum depth of the image.

8. The system of claim 6, wherein the image depth information is embedded in metadata.

9. The system of claim 6, wherein the analyzer is further configured to determine the image depth information through image analysis.

10. The system of claim 6, wherein the threshold force value is programmably adjustable.

* * * * *